United States Patent
Rashley et al.

(10) Patent No.: US 11,084,749 B2
(45) Date of Patent: Aug. 10, 2021

(54) BATCH INLET AND CLEANING DEVICE FOR GLASS MELTER

(71) Applicant: Owens-Brockway Glass Container Inc., Perrysburg, OH (US)

(72) Inventors: Shane T. Rashley, Bowling Green, OH (US); Robert Kuhlman, Dundee, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 260 days.

(21) Appl. No.: 16/196,822

(22) Filed: Nov. 20, 2018

(65) Prior Publication Data
US 2020/0156978 A1 May 21, 2020

(51) Int. Cl.
*C03B 3/00* (2006.01)
*C03B 5/235* (2006.01)

(52) U.S. Cl.
CPC .............. *C03B 3/00* (2013.01); *C03B 5/2356* (2013.01)

(58) Field of Classification Search
CPC ................................ C03B 3/00; C03B 5/2356
See application file for complete search history.

(56) References Cited

U.S. PATENT DOCUMENTS

| | | |
|---|---|---|
| 1,977,300 A | 10/1934 | Blunt |
| 2,926,458 A * | 3/1960 | Lauck ..................... C03B 5/173 65/146 |
| 3,850,606 A | 11/1974 | Rough |
| 3,951,635 A | 4/1976 | Rough, Sr. |
| 5,135,169 A | 8/1992 | Mensink |
| 6,047,566 A | 4/2000 | Fleckenstein et al. |
| 7,010,940 B2 | 3/2006 | Ogino et al. |
| 7,730,744 B2 | 6/2010 | Ogino et al. |
| 7,926,301 B2 | 4/2011 | Johnson |
| 8,978,419 B2 | 3/2015 | DeAngelis et al. |
| 9,394,192 B2 | 7/2016 | Villeroy DeGalhau et al. |
| 9,643,869 B2 | 5/2017 | Shock et al. |
| 2011/0236846 A1 | 9/2011 | Rue et al. |
| 2017/0022083 A1 | 1/2017 | Huber et al. |
| 2017/0073262 A1 | 3/2017 | Charbonneau et al. |
| 2018/0002213 A1* | 1/2018 | Demott ................. F27D 3/0033 |

FOREIGN PATENT DOCUMENTS

| | | |
|---|---|---|
| FR | 2687592 A1 | 8/1993 |
| JP | H01122930 A | 5/1989 |

OTHER PUBLICATIONS

Int. Search Report and Written Opinion, Int. Serial No. PCT/US2019/058700, Int. Filing Date: Oct. 30, 2019, Applicant: Owens-Brockway Glass Container Inc., dated Feb. 7, 2020.

* cited by examiner

*Primary Examiner* — Queenie S Dehghan

(57) ABSTRACT

A glass melter batch inlet and cleaning device and related methods of its operation are disclosed. The glass melter batch inlet and cleaning device includes an outer tubular housing including a side inlet, an inner tubular chopper including a side inlet relief in registration with the side inlet of the outer tubular housing, and at least one actuator extending alongside the outer tubular housing and coupled to the inner tubular chopper to move the chopper with respect to the outer tubular housing.

21 Claims, 2 Drawing Sheets

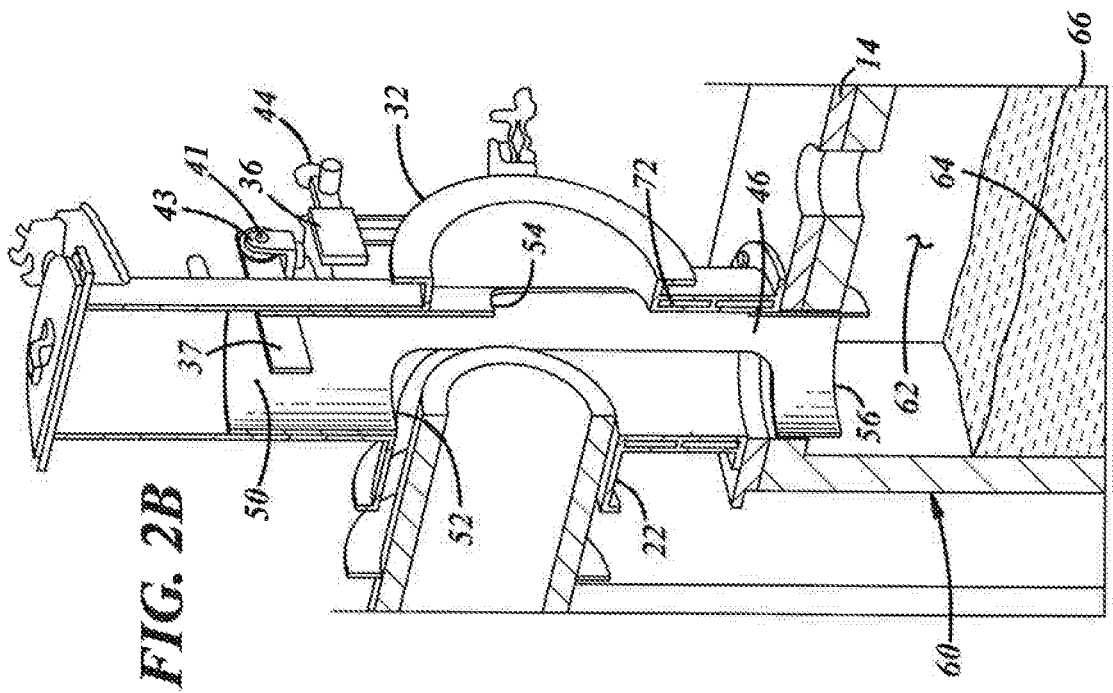
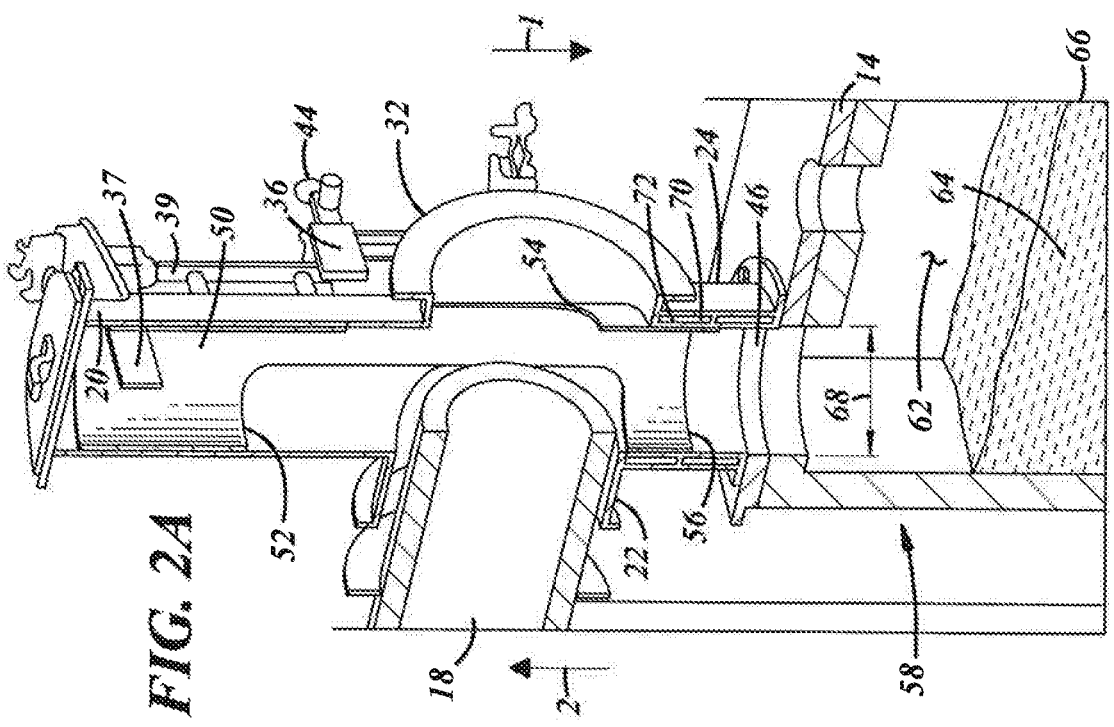

BATCH INLET AND CLEANING DEVICE FOR GLASS MELTER

This patent application discloses devices and methods of glass manufacturing, and more particularly, devices and methods to deliver glass batch materials supply into a furnace or melter.

BACKGROUND

Submerged combustion melting ("SCM") furnaces typically have an inlet in a furnace wall, usually near a roof or top surface, for delivering glass batch raw materials into the furnace to be melted into molten glass. SCM furnaces can operate at high melting temperatures of 1000° C. to 2000° C. or more. Because of the high temperatures and in order to protect the components of the SCM furnace itself, the furnace walls are fluid cooled (e.g., water cooled) and/or have cooled panels to lower the temperature of the panels to form a solidified or frozen layer of glass on the interior surface of the panels to protect the wall panels from erosion and corrosion.

The molten glass inside the SCM furnace is turbulent and can splash around, covering the inside of the furnace, including the inlet to deliver the glass batch therethrough. Over time, this splashing, coupled with the fluid cooled panels, can form the solidified layer of glass at the inlet and impede or close off delivery of the glass batch into the furnace.

BRIEF SUMMARY OF THE DISCLOSURE

The present disclosure embodies a number of aspects that can be implemented separately from or in combination with each other.

In accordance with one aspect of the disclosure, there is a glass batch inlet and cleaning device that includes an outer tubular housing including a side inlet, an inner tubular chopper including a side inlet relief in registration with the side inlet of the outer tubular housing, and at least one actuator extending alongside the outer tubular housing and coupled to the inner tubular chopper to move the chopper with respect to the outer tubular housing.

In accordance with another aspect of the disclosure, there is provided a method of using a glass melter batch inlet and cleaning device. The method includes passing glass batch through the glass melter batch inlet and cleaning device having an outer tubular housing with a side inlet and an inner tubular chopper including a side inlet relief in registration with the side inlet, the outer tubular housing also having an outlet for the glass batch, and actuating the inner tubular chopper. The inner tubular chopper is actuated from a first position in which a chopping end of the inner tubular chopper is maintained in the outer tubular housing to a second position in which the chopping end extends out of the outer tubular housing and through the outlet.

BRIEF DESCRIPTION OF THE DRAWINGS

The disclosure, together with additional objects, features, advantages and aspects thereof, will be best understood from the following description, the appended claims and the accompanying drawings, in which:

FIGS. 2A-B are perspective, sectional views of the glass melter batch inlet and cleaning device of FIG. 1A, in accordance with an illustrative embodiment of the present disclosure.

DETAILED DESCRIPTION

A general object of the present disclosure, in accordance with one aspect thereof, is to provide a glass melter batch inlet and cleaning device having an outlet such that the cleaning device clears any solidified or frozen glass from the outlet. In other words, the cleaning device provides a way to connect a batch charger to a melter and direct glass batch into the melter so that an opening or outlet between the cleaning device and the melter remains clear.

In glass manufacturing, glass batch is a general term to describe the raw or starting materials used to form a uniform composition of molten glass that can be subsequently processed into glass objects. The raw materials can include a variety of different chemical compositions (e.g., various oxides to form soda-lime-silica glass, borosilicate glass or other glasses) and can be mixed with cullet or recycled glass to form a glass batch. The glass batch is typically delivered or passed into a glass furnace or melter by way of a glass or batch charger. The batch charger can be connected to the melter at any desired location and can have a hole or outlet to pass glass batch into the melter to be melted. In some cases, the outlet can become clogged, or otherwise malfunction, so that the glass batch either enters at a reduced rate or cannot enter the melter at all.

Due to the high temperatures in glass melters or furnaces, they often include liquid cooled areas to prevent damage while maintaining the molten glass within the melter at its melting temperature. However, if the molten glass splatters or is otherwise deposited into a batch inlet, the glass can solidify, thereby clogging or preventing the introduction of batch into the melter, interfering with the normal operation of the melter.

Figure 1A:
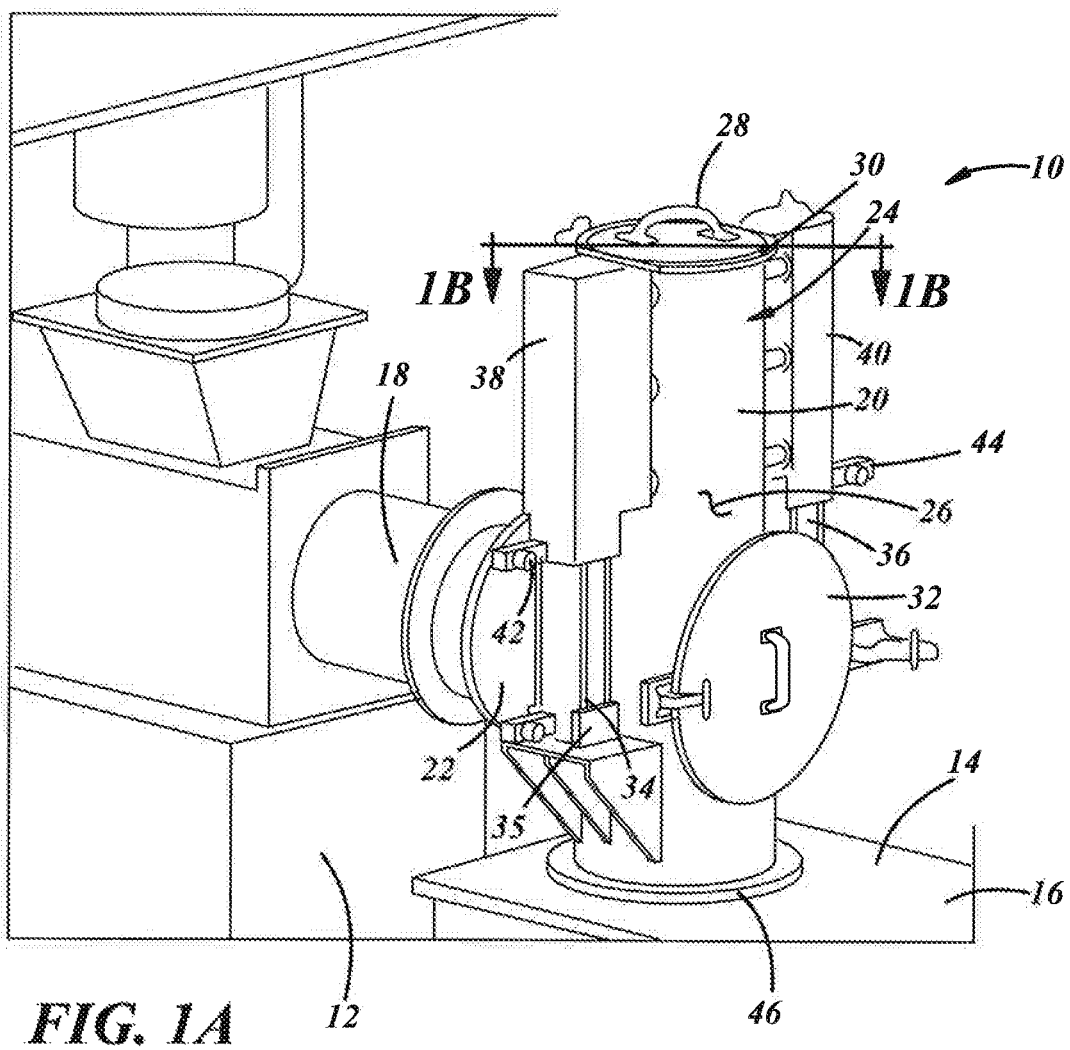
FIGS. 1A-B are exterior views of a glass melter batch inlet and cleaning device in accordance with an illustrative embodiment of the present disclosure.
Figure 1B:
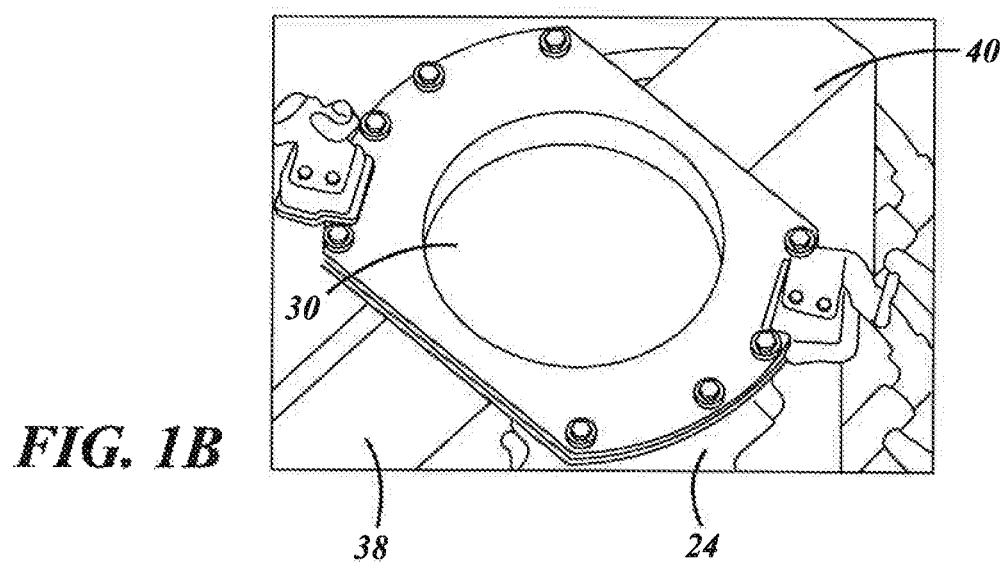

FIGS. 1A-B illustrate exterior views of the glass melter batch inlet and cleaning device 10 ("cleaning device 10") in accordance with an illustrative embodiment of the present disclosure. The cleaning device 10 is positioned between a batch charger 12 and a glass melter 14. The batch charger 12 has a charger outlet 18 that is generally horizontally positioned and delivers the glass batch horizontally into the cleaning device 10. Specifically, an angle between the axes of the charger outlet 18 and an outer tubular housing 20 of the cleaning device 10 is approximately 90°. For purposes of this disclosure, "approximately" means that a given quantity is within 10%, preferably within 5%, more preferably within 1%, of a comparison value (e.g., the angle is within 1% of 90°). In one example, the angle between the axes of the charger outlet 18 and the outer tubular housing 20 can be in a range of 0° to 135°, including all ranges, subranges, and values therebetween. As shown in FIG. 1A, the charger outlet 18 and a side inlet 22 of the cleaning device 10 are coaxial.

The batch charger 12 delivers the glass batch through the charger outlet 18, through the cleaning device 10, and into the melter 14. By positioning the batch charger 12 horizontally with respect to, or next to, the cleaning device 10, rather than positioning the batch charger above the top of the cleaning device 10, the overall set-up can be shorter and require less overall space to house it than a conventional system. This can be especially helpful with SCM, where one goal can be to provide a smaller, more compact melting system.

In this particular arrangement, the cleaning device 10 is directly connected to the melter 14 through a roof 16, or upper wall, of the melter 14. However, it will be appreciated that the cleaning device 10 could be connected to the melter 14 through any portion of the melter (e.g., the side walls, floor, etc). While the glass melter batch inlet and cleaning device 10 is referred to also as cleaning device 10 herein, it will be appreciated that the cleaning device 10 also includes an inlet for the glass batch from the batch charger 12.

In further detail, the cleaning device 10 includes an outer tubular housing 20 that has a side inlet 22 for connecting with the charger outlet 18. As shown in FIG. 1A, the side inlet 22 is also horizontally positioned. The tubular housing 20 has an outer wall 24 that forms an interior 26 or hollow cavity of the tubular housing. The glass batch passes from the side inlet 22 and into the interior 26 of the tubular housing 20.

At the upper end of the cleaning device 10, there is an upper viewing port 30 through which the side inlet 22 and other internal components of the cleaning device 10 are viewable. A molten material (e.g., molten glass) within the melter 14 can also be viewed through the upper viewing port 30. The upper viewing port 30 can include components that are quickly and easily removed for viewing and/or accessing the interior 26 (e.gs., cover, lids, handles, latches, and/or the like). The upper viewing port 30 is positioned adjacent and below a cover 28. The cover 28 can be a solid plate with a handle that closes up and protects the upper viewing port 30 when not being used. For purposes of this disclosure, "adjacent" means next to or nearby. The upper viewing port 30 can include a transparent material for viewing the internal components of the cleaning device 10 and/or can be at least partially formed of a mesh for protecting the internal components of the cleaning device 10 from debris and/or the like while still allowing viewing. Additionally, the upper viewing port 30 can be used by an operator to observe the introduction of batch into the cleaning device 10 or to observe the operation of the cleaning device 10 without danger of being pinched or otherwise hurt by movement of various other components of the cleaning device 10. The upper viewing port 30 is located between the cover 28 and the outer tubular housing 20.

While the upper viewing port 30 is mostly obscured in FIG. 1A, section 1B-1B is further depicted in FIG. 1B, also showing the upper viewing port 30. The upper viewing port 30 extends around the circumference of the outer tubular housing 20 and protects the interior 26 while still allowing viewing. While the outer tubular housing 20 is depicted as being tubular here and having a circumference and a diameter, it could also be of other cross-sectional shapes, such as triangular, square, rectangular, oval or any other shape.

Returning to FIG. 1A, the cleaning device 10 also includes a side cleanout port 32, through which the interior 26 of the cleaning device 10 is accessible. The side cleanout port 32 can be opened and allows an operator or other person to access, clean, view, and/or take samples (e.g., of the glass batch) from the interior 26.

The exterior of the cleaning device 10 also includes at least one actuator (e.g., the first and second actuators 34, 36) extending alongside the outer tubular housing 20 and coupled thereto, The actuators allow movement of internal components of the cleaning device 10, which will be discussed further in FIGS. 2A-B below. While the discussion of the at least one actuator herein may relate to either of the exemplary actuators 34, 36, it will be appreciated that the cleaning device 10 may have more than one actuator that include any or all of the components discussed with either or both of the exemplary actuators 34, 36. Any or all of the actuators in the cleaning device 10 may be identical or mirror images of each other, for example, so that the cleaning device 10 has a symmetrical arrangement of actuators therearound.

In FIG. 1A, the actuators 34, 36 are connected to and/or covered by safety guards 38, 40 and control valves 42, 44, respectively. The safety guards 38, 40, which respectively cover portions of the actuators 34, 36, protect the actuators 34, 36 and keep them in their proper position extending alongside the outer tubular housing 20 to maintain normal functioning of the actuators 34, 36. Additionally, the safety guards 38, 40 can protect the operator from injury due to the movement of the actuators 34, 36. The guards 38, 40 can include proximity switches therewith to sense when each respective actuator 34, 36 is either in the fully up or fully down position in order to assist in their function. In FIGS. 1A-B, the actuators 34, 36 and their corresponding components are located on the outer wall 24 of the outer tubular housing 20 and about its circumference such that they oppose each other across the diameter of the outer tubular housing 20. However, it will be appreciated that these components could also be located at different locations around the outer wall 24.

The actuators 34, 36 can include any components that create movement, including cylinders, pistons, springs, diaphragms, valves, motors, gears, pulleys, chains, screws, and/or the like. They can include an energy source that is electric, pneumatic, hydraulic, and/or mechanical to cause motion. Motion of the internal components of the cleaning device 10 is brought about when the actuators 34, 36 receive a control signal, working fluid, and/or the like.

The control valves 42, 44 are also respectively connected to the actuators 34, 36. These valves control and/or maintain an appropriate speed for each actuator so that they operate properly. The control valves 42, 44 can control the speed for each respective actuator 34, 36 and can also synchronize the movement of the actuators 34, 36 and/or an inner tubular chopper 50, discussed in further detail below. It will be appreciated that if there were more or fewer actuators, there could correspondingly be more or fewer safety guards and/or control valves as well.

As the glass batch exits the cleaning device 10, it passes through an outlet 46 and into the melter 14. Within the melter 14, the glass batch will be melted and mixed to create a uniform mixture of the molten glass.

While FIGS. 1A-B show the external components of the cleaning device 10, FIGS. 2A-B provide detail regarding the internal components. Within the outer tubular housing 20 is an inner tubular chopper 50. The inner tubular chopper 50 is correspondingly shaped to fit and slide within the outer tubular housing 20 while accommodating other features or components. For example, the inner tubular chopper 50 includes a side inlet relief 52, or cutout, in registration with the side inlet 22 of the outer tubular housing 20. The inner tubular chopper 50 also includes a side cleanout relief 54, or cutout, in registration with the side cleanout port 32 of the outer tubular housing 20. Thus, the shape of the reliefs 52, 54 will correspond and/or complement the shape of the side inlet 22 and the side cleanout port 32 so that the side inlet 22 and the side cleanout port 32 fit within the respective reliefs 52, 54, and that the reliefs can move relative to both of the side inlet 22 and the side cleanout port 32 as the inner tubular chopper 50 is actuated.

As shown in FIGS. 2A-B, both of the reliefs 52, 54 are rectangular with rounded corners and formed around the circumference of the inner tubular chopper 50. Correspondingly, the side inlet 22 and the side cleanout port 32 include a cylindrical or tubular portion, with a circular cross-section, so that these cylindrical components can fit within and slide relative to the reliefs 52, 54 of the inner tubular chopper 50. More specifically, the inner tubular chopper 50, which includes the reliefs 52, 54, can slide up and down while the side inlet 22 and the side cleanout port 32 remain stationary. In FIG. 2A, both of the side inlet 22 and the side cleanout port 32 are at a lower portion of the reliefs 52, 54, respectively, while the tubular chopper 50 is in a raised position relative to the outer tubular housing 20. Contrastingly, in FIG. 2B, both of the side inlet 22 and the side cleanout port 32 are at an upper portion of the reliefs 52, 54, respectively, while the tubular chopper 50 is in the lowered position relative to the outer tubular housing 20. Additionally, just as the side inlet 22 is visible through the upper viewing port 30, so is the inner tubular chopper 50 visible through the upper viewing port 30.

The first and second actuators 34, 36 are coupled and/or connect through the outer tubular housing 20 to the inner tubular chopper 50 to move the chopper 50 with respect to the outer tubular housing 20. In this way, the cleaning device 10 includes the outer tubular housing 20 with the side inlet 22, the inner tubular chopper 50 with the side inlet relief 52 in registration with the side inlet 22, and at least one actuator (e.g., the actuators 34, 36) extending alongside the outer tubular housing 20 and coupled to the inner tubular chopper 50 to move the chopper 50 with respect to the outer tubular housing 20.

The inner tubular chopper 50 has a chopping end 56 that may be circular or ring-shaped and that breaks or removes solidified glass from the inner surfaces of the cleaning device 10. Specifically, FIG. 2A depicts a first position 58 of the chopping end 56 of the inner tubular chopper 50 and FIG. 2B depicts a second position 60 of the chopping end 56 of the inner tubular chopper 50. In the first position 58, the chopping end 56 is maintained in the outer tubular housing 20. This can be a resting position. When desired, in the second position 60, the chopping end 56 is extended out of the outer tubular housing 20 and through the outlet 46 to remove or chop any solidified glass that blocks the outlet 46. This can be an actuated position. The chopping end 56 is moved linearly within the outer tubular housing 20, although other pathways are possible, (e.gs., helical, reciprocating and/or circular fashion). It will be appreciated that the chopping end 56 can be shaped to correspond to the outlet 46 so that, once actuated, no frozen glass can remain blocking the outlet 46.

The actuators 34, 36 may be arranged around the circumference of the inner tubular chopper 50 and across the diameter of the chopper 50 so that each actuator exhibits an equally distributed force on the inner tubular chopper 50, and when the actuators 34, 36 are energized in a first direction (shown with arrow 1), they pull the chopper 50 from the first position 58 to the second position 60. When the actuators 34, 36 are energized in an opposite direction (shown with arrow 2), the chopper 50 returns from the second position 60 to the first position 58. For example, pneumatic actuators have a fluid circuit that applies fluid on one side of a piston, and on the opposite side in an alternating way. Because the actuators are arranged alongside the outer tubular housing 20 and the inner tubular chopper 50, they do not add any height to the overall cleaning device 10 and can provide a lower profile than if they were arranged on top of the outer tubular housing 20. This reduces the overall height and length of the overall set-up described herein.

The first actuator 34 may have an actuator housing with a lower portion 35 that may be coupled to the outer tubular housing 20 adjacent the roof 16. It will be appreciated that the lower portion 35 could be coupled at any first location on the housing 20. FIG. 1A depicts the lower portion 35 attached to the housing 20 by way of a bracket; however, the lower portion 35 could be coupled directly or indirectly to the housing 20 by any suitable means, including with fasteners, pins, pegs, welding, or the like. Likewise, the actuator housing may have an upper portion that may be coupled to a second location on the housing 20 spaced longitudinally apart from the first location. Alternatively, the actuators could be carried and/or coupled to the roof 16 in a similar manner as to the housing 20.

More specifically, the actuators 34, 36 may be coupled to the inner tubular chopper 50 by way of an arm 37 that extends through the cleaning device 10. While FIGS. 2A-B depict sectional views of the cleaning device, it will be appreciated that the arm 37 can extend from the first actuator 34 (not shown in FIGS. 2A-B), through the outer tubular housing 20 and inner tubular chopper 50, to the second actuator 36. In this configuration, the arm 37 is disposed between the actuators 34, 36. FIGS. 2A-B do not show the safety guards so the internal components of the cleaning device 10 are visible.

In addition to the arm 37 being connected to the actuators 34, 36, portions of the arm 37 may be disposed in a pair of opposing slots in the inner tubular chopper 50. In this way, movement by the actuators 34, 36 causes a corresponding movement in the arm 37, which in turn, acts upon the inner tubular chopper 50 to move the chopper 50 between the first and second positions 58, 60. The outer tubular housing 20 can have corresponding slots, voids, or bores to accommodate movement of the arm 37.

Each actuator (e.g., the second actuator 36) can have a rod (e.g., a second rod 39) that connects to the arm 37 and extends from the arm 37 and to a point adjacent the control valve (e.g., the second control valve 44). Likewise, the first actuator 34 can include a first rod (not shown). The rod (e.g., the second rod 39) can be coupled to the arm 37 via a pin 41 and clevis 43 arrangement such that the clevis 43 and the arm 37 contain respective bores to accommodate the pin 41 that extends through the bores and connects the arm 37 and second actuator 36. In the first position 58, the second rod 39 is in an extended state. When the inner tubular chopper 50 is in the first position 58, the arm 37 and the second rod 39 can extend to a top portion of the housing 20, adjacent the upper viewing port 30. When the inner tubular chopper 50 is actuated to the second position 60, the actuators can pull the inner tubular chopper 50 so that actuators retract and the arm 37 and the second rod 39 move in the first direction 1 towards the melter 14, correspondingly moving the second rod 39 to a retracted state. As the actuators lengthen in the opposite direction 2, they move the arm 37, the rod 39 and the chopper 50 away from the melter, with the rod 39 in an extended state.

Because the actuators 34, 36 are located alongside the outer tubular housing 20 and pull the chopper 50, they are inverted and have a compact arrangement that reduces the overall height of the cleaning device 10. Additionally, at least one actuator retracts in the first direction 1, further contributing to the compact arrangement.

Of course, it is possible to arrange these actuators in other positions, such that they are located on top of the outer tubular housing 20 and/or that they push the inner tubular chopper 50 from the first position 58 to the second position 60, from the second position 60 to the first position 58, or both. The actuators 34, 36 do not have to be inverted. The cleaning device 10 can also be arranged with only one or multiple actuators, safety guards, and/or control valves, for example, by using guides, bearings, or other like components suitable for use with an actuator.

The outer wall 24 of the outer tubular housing 20 can form hollow areas or interior voids (e.g., an interior void 70) for circulating a coolant 72 through the outer tubular housing 20. It may be desirable for portions of the cleaning device 10 to be fluid cooled to protect them from the extreme temperatures in the melter 14. Thus, the coolant 72 can cool these portions or areas, specifically those that are closest to the melter 14. The interior void 70 can be adjacent the outlet 46. Melter 14 may have side walls (e.g., the side wall 66) that extend down from the roof 16 and form a cavity 62. Cavity 62 may be partially filled with empty space and partially filled with the molten glass 64.

The molten glass 64 can splatter and cover the area 68 adjacent the outlet 46, and clog the further delivery of the glass batch from the cleaning device 10 into the melter 14. Thus, the inner tubular chopper 50 operates in this area 68 to clear any solidified glass and maintain the opening of the outlet 46. It will be appreciated that the inner tubular chopper 50 could be actuated on demand, for example when the glass batch solidifies at the outlet in order to clear the solidified glass batch from the outlet, and/or at a periodic interval or specific time point. The inner tubular chopper 50 can be actuated automatically, manually, or some combination of the two.

The melting apparatus and method described herein may be used in different types of glass melting, including submerged combustion melting (SCM). SCM is a type of melting used in glass manufacturing. In submerged combustion melting (SCM), an air-fuel or oxygen-fuel mixture is injected directly into a pool of raw materials within a melting chamber or melter. Burners are arranged at the bottom and sides of the chamber beneath the top surface of the materials. The burners stimulate rapid melting of the raw materials by combustion of the fuel within the pool of raw materials. Combustion gases bubble through the raw materials, creating turbulent mixing of the raw materials at a high-heat transfer rate, melting the raw materials into the molten glass and also mixing the molten glass to create a homogeneous glass. Once the molten glass achieves a uniform composition, it can then be drained from the chamber to be further processed and/or used to form desired products.

The SCM technique yields intense combustion and direct-contact heat transfer as the combustion gases bubble through the raw materials and the molten glass, and a high rate of heat transfer, giving high thermal efficiency. Due to these advantages, SCM uses less energy to melt the raw materials and can utilize a smaller melter and/or furnace as compared to other melting methods. Likewise, the molten glass spends less time in the melter and is rapidly mixed. SCM systems can be simple and inexpensive because the SCM chamber is tolerant of a wide range of raw material and cullet size, can accept multiple types of raw material feeds, and does not require perfect feed blending prior to addition to the chamber.

However, the turbulent mixing of the raw materials at a high-heat transfer rate causes high temperatures, extreme temperature changes, and/or splattering of the molten glass inside the melter. Thus, the cleaning device 10 can allow a consistent glass batch feed rate and overall operation with SCM because it can clear solidified glass from the outlet 46 so that solidified glass does not restrict the glass batch delivery by partially or fully blocking the outlet 46.

In operation, a method of using the cleaning device 10 includes passing glass batch through the cleaning device 10 having the outer tubular housing 20 with the side inlet 22 and the inner tubular chopper 50 including the side inlet relief 52 in registration with the side inlet 22, the outer tubular housing 20 also having the outlet 46 for the glass batch. Once the glass batch is passed through the cleansing device 10 and into the melter 14, it may splatter and solidify at or near the outlet 46.

The method includes actuating the inner tubular chopper 50 from the first position 58 in which the chopping end 56 of the inner tubular chopper 50 is maintained in the outer tubular housing 20 to the second position 60 in which the chopping end 56 extends out of the outer tubular housing 20 and through the outlet 46 to clear solidified glass from the outlet 46 and any adjacent components of the cleaning device 10 and the melter 14. In this way, the melter 14 can continue to form the molten glass. Solidified glass is mechanically cleared, and glass batch continues to be delivered from the batch charger 12, though the cleaning device 10, and into the melter 14, without any stoppage or reduction in the glass batch flow rate.

The method can further include accessing the interior 26 of the cleaning device 10 through the side cleanout port 32 in the outer tubular housing 20 at any desired time during glass manufacturing. Accessing the interior 26 can include taking the sample of the glass batch through the side cleanout port 32. Additionally, the step of passing glass batch can include horizontally passing the glass batch through the side inlet 22 and/or generally vertically passing the glass batch through the outlet 46 and into the melter 14.

Specifically, an angle between the outlet 46 and a longitudinal axis of the roof 16 of the melter 14 is approximately 90°. For purposes of this disclosure, "approximately" means that a given quantity is within 10%, preferably within 5%, more preferably within 1%, of a comparison value (e.g., the angle is within 1% of 90°). The angle between the outlet 46 and the longitudinal axis of the roof 16 can be in a range of 0° to 180°, including all ranges, subranges, and values therebetween. More specifically, an angle of 0° can mean that the outlet 46 is positioned in one of the side walls (e.g., the side wall 66) and an angle of 180° can mean that the outlet 46 is positioned in an opposing side wall (e.g., the opposing side wall to the side wall 66).

Actuating the inner tubular chopper 50 can include pulling or pushing the chopper 50 between the first and second positions, such as pulling the chopper 50 from the first position 58 to the second position 60. The step of actuating the chopper 50 can include using first and second actuators 34, 36 extending alongside the outer tubular housing 20 to pull the inner tubular chopper 50 from the first position 58 to the second position 60. Once the glass batch materials are fully melted, the molten glass can be withdrawn from the melter 14, further processed, and/or formed into glass objects in any desired manner. Once the molten glass exits the melter 14, the surface or top level of the molten glass during downstream processing may be maintained at any desired position or level, including the level that is not equivalent or substantially equivalent to the surface or top level of the molten glass 64 in the melter 14, taking into consideration manufacturing and/or engineering tolerances of the equipment.

It will be appreciated that the distance between the outlet 46 and the surface or top level of the molten glass 64 can be any distance that is desired. In one example, the distance could be less than 0.5 times or more than 1.5 times the overall depth of the molten glass 64, including all ranges, subranges, and values therebetween. The distance could be between thirty-six (36) inches and forty-eight (48) inches, including all ranges, subranges, and values therebetween. Additionally, the type of glass produced can be any type of glass, including or excluding borosilicate, phosphorus, fluorine, and/or any other composition. If the melter is a submerged combustion melter, it can have any arrangement of the typical components, including submerged combustion burners positioned less than 4 inches apart from the side walls (e.g., the side wall 66), more than 20 inches apart from each other, or any other arrangement desired. The melter 14 may include and/or exclude any typical components, including centrifugal equipment, screw-type batch chargers, and/or the like.

There thus has been disclosed the cleaning device 10 for delivering and maintaining the outlet 46 for glass batch into a melter 14 that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glass melter batch inlet and cleaning device, comprising:
   an outer tubular housing including a side inlet;
   an inner tubular chopper including a side inlet relief in registration with the side inlet of the outer tubular housing; and
   at least one actuator extending alongside the outer tubular housing and coupled to the inner tubular chopper to move the chopper with respect to the outer tubular housing.

2. The device of claim 1, wherein the outer tubular housing also includes a side cleanout port through which an interior of the device is accessible, and wherein the inner tubular chopper also includes a side cleanout relief in registration with the side cleanout port of the outer tubular housing.

3. The device of claim 1, further comprising an upper viewing port through which the side inlet and the inner tubular chopper are viewable.

4. The device of claim 3, wherein the upper viewing port includes one of a mesh or transparent material.

5. The device of claim 3, further comprising a cover located above the upper viewing port.

6. The device of claim 1, wherein the outer tubular housing has an outlet for passing glass batch into a melter, and the inner tubular chopper has a chopping end and includes a first position in which the chopping end is maintained in the outer tubular housing and a second position in which the chopping end extends out of the outer tubular housing through the outlet.

7. The device of claim 6, further comprising an arm extending through the inner tubular chopper, and wherein the at least one actuator comprises a rod coupled to the arm, the rod being in an extended state when the inner tubular chopper is in the first position and being in a retracted state when the inner tubular chopper is in the second position so that the at least one actuator is arranged to pull the inner tubular chopper from the first position to the second position.

8. The device of claim 7, wherein the at least one actuator is a first actuator and a second actuator both extending alongside the outer tubular housing, both of the first and second actuators being arranged to pull the inner tubular chopper from the first position to the second position.

9. The device of claim 1, wherein the at least one actuator is connected to a safety guard to maintain the actuator.

10. The device of claim 6, further comprising at least one control valve coupled to the inner tubular chopper and the at least one actuator, and wherein the control valve is for controlling a speed of the inner tubular chopper as it moves between the first and second positions.

11. The device of claim 10, wherein the at least one control valve is a first control valve and a second control valve, both valves being coupled to the inner tubular chopper and the first and second actuators, respectively, and wherein the control valves are for controlling the speed of the inner tubular chopper.

12. The device of claim 6, wherein the inner tubular chopper is hollow for the glass batch to pass from the side inlet, through the inner tubular chopper, and through the outlet when the inner tubular chopper is in either of the first or second positions.

13. The device of claim 1, wherein outer tubular housing has an outer wall that forms an interior void for circulating a coolant.

14. The device of claim 13, wherein the outer tubular housing has an outlet for passing glass batch into a melter, and wherein the interior void is adjacent to the outlet.

15. A method of using a glass melter batch inlet and cleaning device, the method comprising:
   passing glass batch through the glass melter batch inlet and cleaning device having an outer tubular housing with a side inlet and an inner tubular chopper including a side inlet relief in registration with the side inlet, the outer tubular housing also having an outlet for the glass batch; and
   actuating the inner tubular chopper from a first position in which a chopping end of the inner tubular chopper is maintained in the outer tubular housing to a second position in which the chopping end extends out of the outer tubular housing and through the outlet.

16. The method of claim 15, further comprising accessing an interior of the device through a side cleanout port in the outer tubular housing.

17. The method of claim 16, wherein the step of accessing an interior includes taking a sample of the glass batch through the side cleanout port.

18. The method of claim 15, wherein the step of actuating the inner tubular chopper includes pulling the inner tubular chopper from the first position to the second position.

19. The method of claim 15, wherein the step of actuating the inner tubular chopper includes actuating the inner tubular chopper when glass solidifies at the outlet in order to clear the solidified glass from the outlet.

20. The method of claim 15, wherein the step of passing glass batch includes horizontally passing the glass batch through the side inlet.

21. The method of claim 20, wherein the step of passing glass batch includes vertically passing the glass batch through the outlet.

* * * * *